April 10, 1962 H. MEISEL ET AL 3,029,168
STARCH MANUFACTURING PROCESS
Filed Oct. 15, 1958 4 Sheets-Sheet 1
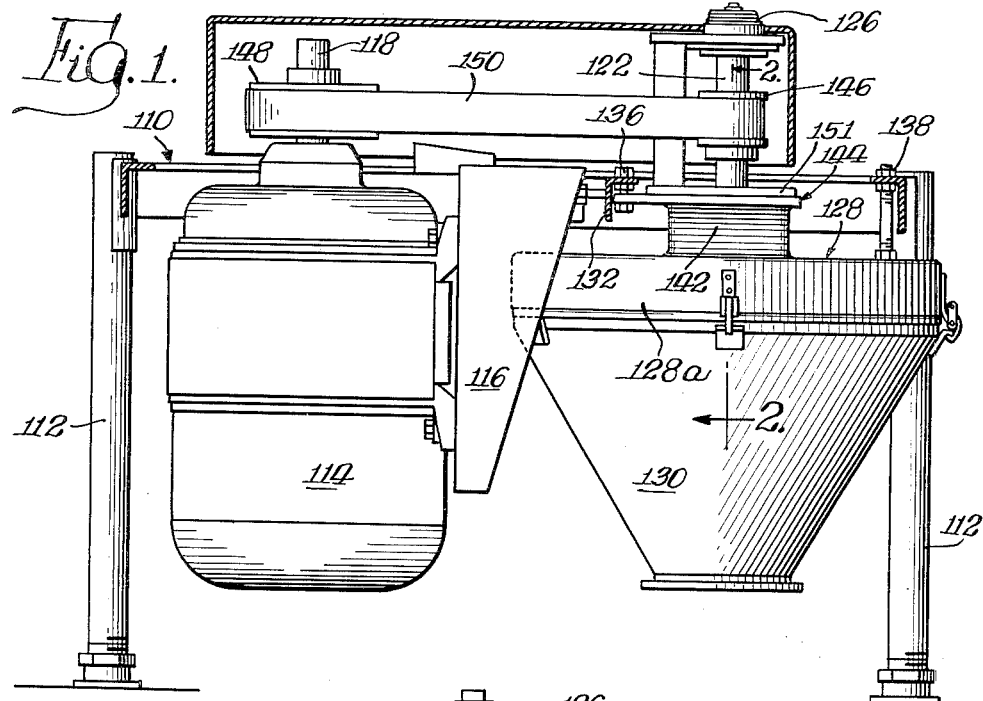
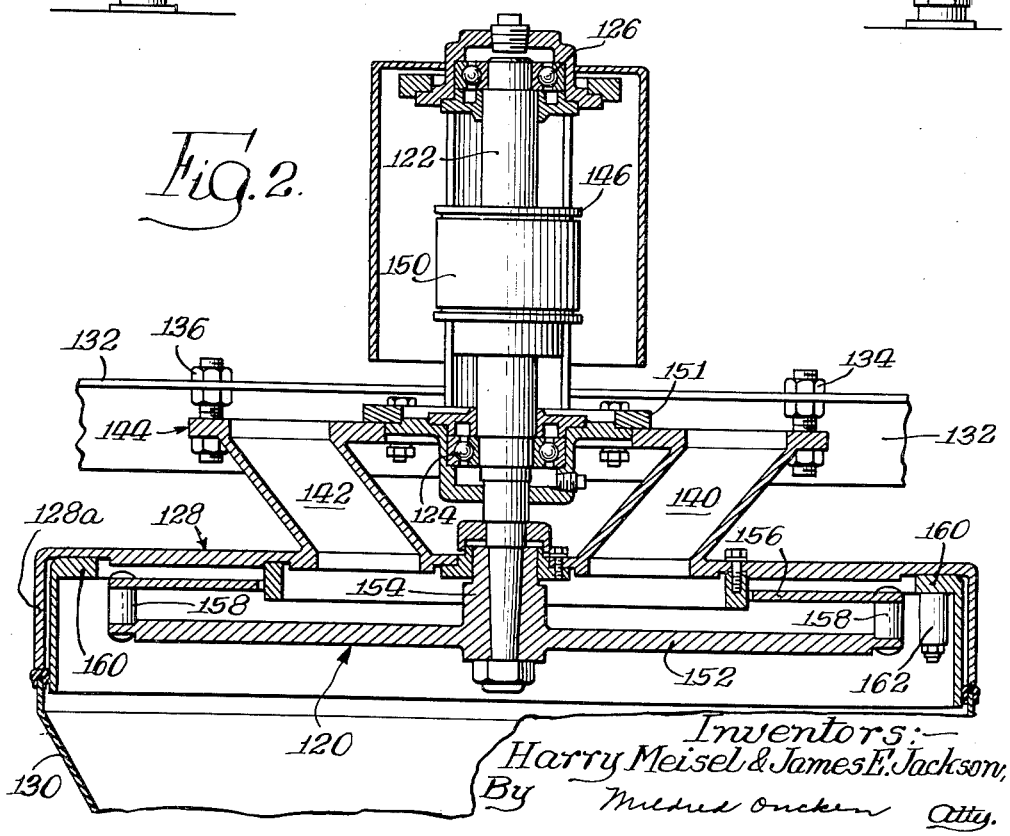
Inventors:—
Harry Meisel & James E. Jackson,
By Mildred Oncken Atty.

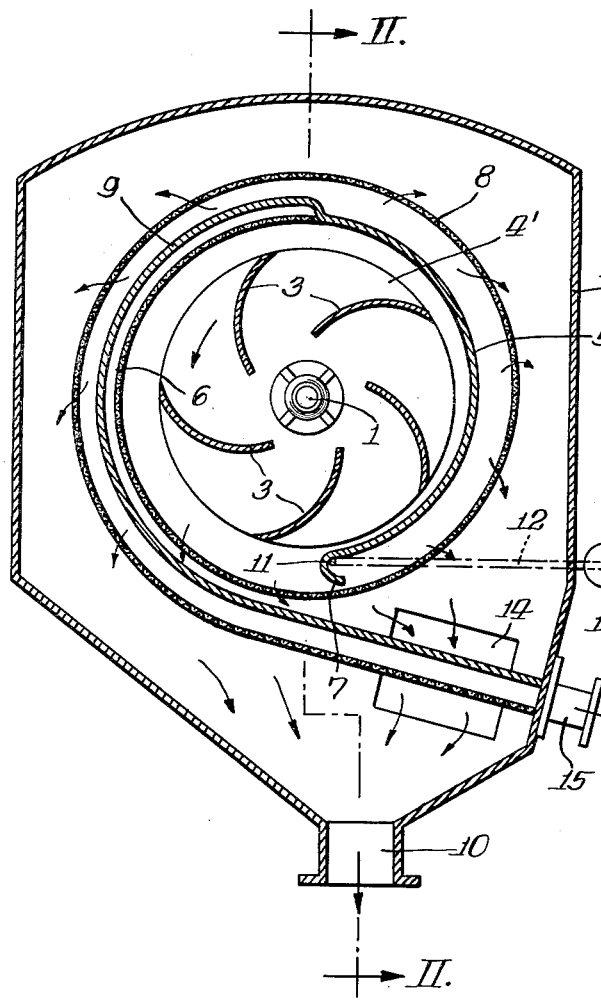
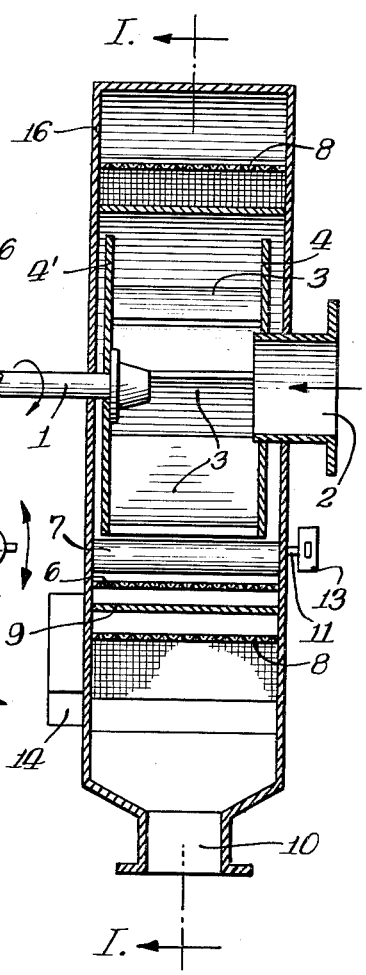

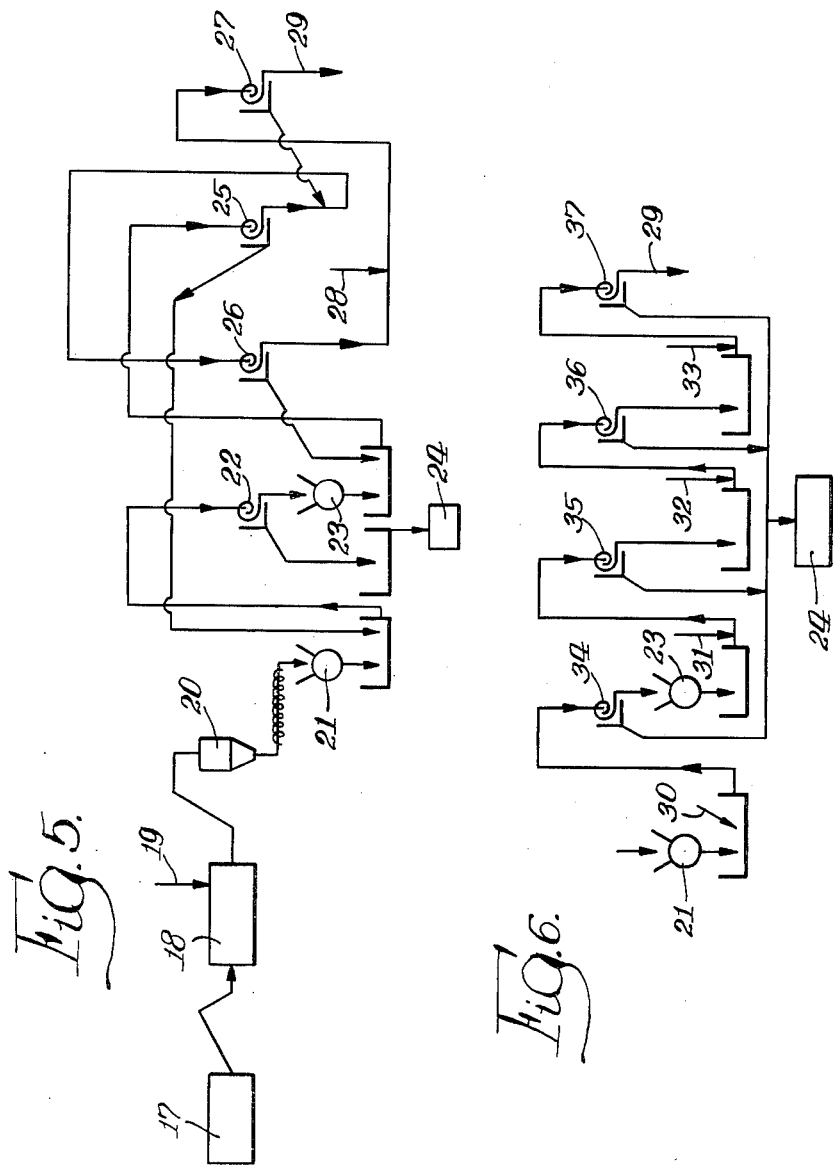

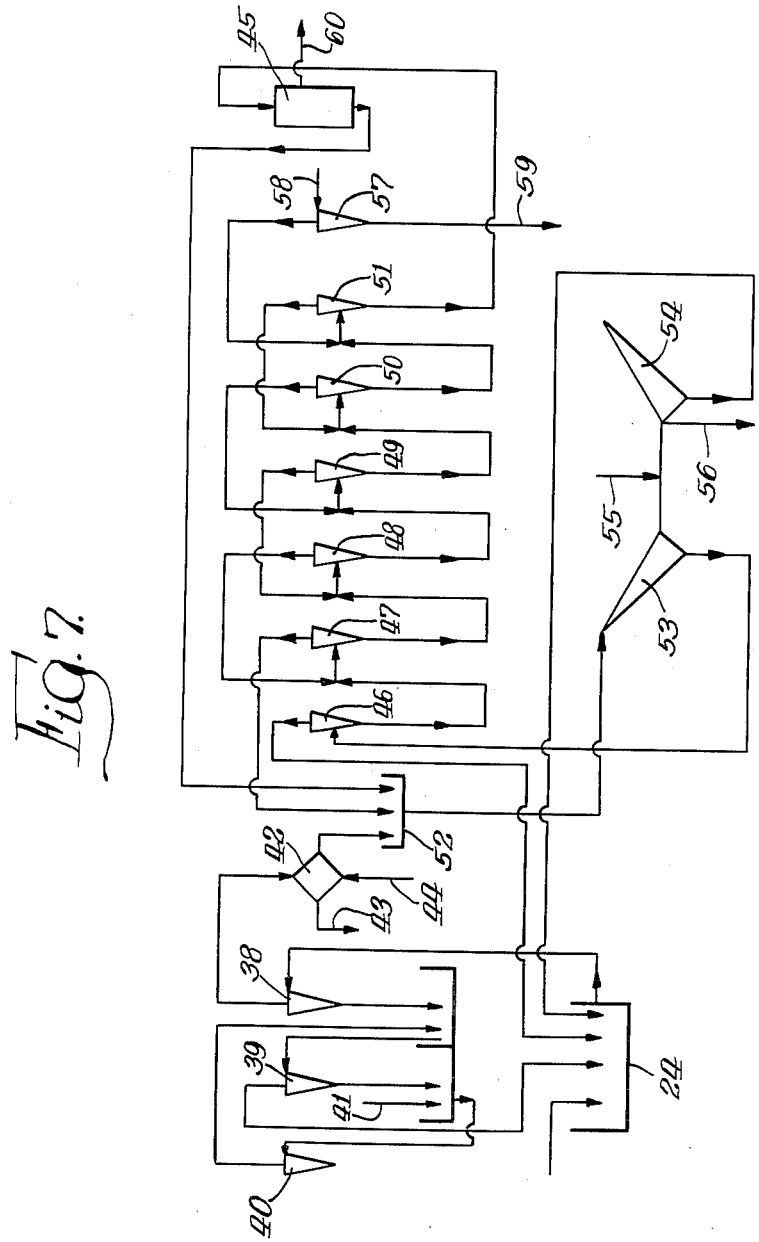

United States Patent Office 3,029,168
Patented Apr. 10, 1962

3,029,168
STARCH MANUFACTURING PROCESS
Harry Meisel, Englewood, N.J., and James E. Jackson, Indianapolis, Ind., assignors to Corn Products Company, a corporation of Delaware
Filed Oct. 15, 1958, Ser. No. 767,324
Claims priority, application Great Britain Sept. 30, 1957
5 Claims. (Cl. 127—67)

This invention relates to the recovery and purification of starch-bearing roots and stems, such as tapioca, potato, sweet potato, arrow root and sago. The invention is applicable not only to fresh roots e.g., tapioca roots, but also to dry roots which have been steeped to rehydrate them and simultaneously to leach them free of soluble constituents. The invention is particularly applicable to fresh tapioca roots and will be described in reference thereto although it is not intended to limit the invention thereby. Tapioca is also referred to as manioc, cassava and yuca but the term tapioca will be used herein.

In the recovery of starch from tapioca root three main steps are involved, namely (1) disintegration of the tuber cells to free the starch granules therefrom (2) washing and separating the liberated starch from the fiber and (3) removing solubles and residual fiber from the resultant starch slurry from step (2).

The materials operated upon after step 1 are slurries, that is, water is in the continuous phase.

The most efficient methods heretofore known for the disintegration step involve the use of mechanical devices, in several stages. The root is first washed and, in some practices, peeled. It is then passed though a grating machine and, optionally, a regrinder. However, even with the more efficient grinding devices, it is impossible to free all of the starch in a single operation, consequently, a pulper is also used. This consists of a fine mesh sieve through which the pulp is rubbed.

The pulp from the aforementioned devices is washed with fresh water over a series of sieves or shakers to wash the liberated starch from the pulp and to separate the bulk of the starch from the fiber. Depending upon the size of the openings of the screens as high as 30 percent, and usually at least 25 percent, of the fiber will go forward with the starch and water.

The resultant starch slurry referred to as mill starch is passed over starch tables or through centrifuges to separate the residual fiber and solubles from the starch. Finally, the starch slurry is dewatered and the starch cake is dried.

There are several disadvantages to presently known methods of recovering starch from tapioca root, the main one being that a large amount of starch, i.e., 35 to 40 percent, remains bound with the fiber even using two passes over the grating machines. The grating devices which are equipped with rasps succeed only, for the most part, in tearing or grinding the tuber cells with the result that the fiber is reduced in particle size but the bulk of the starch is not liberated therefrom. Apparently the grinding action of the rasp is not forceful enough to liberate the starch. Furthermore, during the grating and pulping operations the vascular bundles or fibers in the roots are ground to small particle size also and this ground material increases the amount of fine fiber in the pulp from which the starch must be separated. Hammer mills which are used in some tapioca plants have a similar action to grating devices with attendant formation of fine fibers.

Another disadvantage is that presently known devices for disintegration reduce virtually all of the fiber to fine particles which are, of course, more difficultly separated from liberated starch than would be a coarse fiber.

Another disadvantage of present disintegrating devices is the high cost of maintenance. The blades or teeth in the rasps must be replaced frequently, and by hand, in view of the fact that any hard object, e.g., stones, pieces of steel, in the system will strip the blades or teeth of the rasp instantly. Spare rotors must be on hand at all times. Some operators prefer to take a loss in starch yield rather than replace, by hand, the blades in the rasp.

Among other disadvantages of presently known methods of recovering starch from tapioca roots which may be mentioned here is the fact that large numbers of sieves or shakers are required for the washing operations which in turn require building space, maintenance, higher capital investment in proportion to their number. From the above, it will be apparent that prior art processes generally are inefficient and uneconomical.

The main object of the present invention is to provide certain improvements in the recovery of starch from starch-bearing roots and stems e.g., tapioca roots, whereby process is simplified, the yield of starch increased, and the cost thereof decreased. A specific object of the invention is to provide a means of liberating starch granules from the cells containing them whereby the cell is merely split open or ruptured to release the starch rather than shredded or ground by reduction of particle size. Another object is to increase the number of cells ruptured thereby releasing more starch granules and increasing the yield of starch. Another object is to provide an improved method of liberating starch granules from cells which permits less washing to separate the liberated starch from the fiber than heretofore. Another object is to provide a means of rupturing the cells without grinding up the vascular bundles or fibers in the root. Still another object is to provide a washing system which has increased capacity over processes heretofore known. Other objects will appear hereinafter.

The present invention provides improvements in respect of each of the three main steps previously mentioned and in its preferred form embodies various combinations of the three improved steps.

The present invention provides in a process of recovering starch from starch-bearing roots and stems wherein the starch-bearing material is processed in a wet system to release the starch from the cells and the resultant starch-fiber-fruit water mixture subjected to screening and washing operations to wash and separate the liberated starch from the fiber and the resultant starch slurry is further treated for removal of residual fiber and solubles therefrom, as by starch tables or centrifugal means, the improvement which comprises impacting the starch-bearing material by throwing it against a surface in an impact mill, for example, of the type herein described wherein the starch-bearing material is fed to a rotor rotating at a relatively high speed whereby the starch granules are released from the cells without shredding them nor the vascular fibers.

The present invention further provides in a process of recovering starch from starch-bearing roots and stems wherein the starch-bearing material is processed in a wet system to release the starch from the cells and the resultant starch-fiber-fruit water mixture subjected to screening and washing operations to wash and separate the liberated starch from the fiber and the resultant starch slurry is further treated for removal of residual fiber and solubles, as by starch tables or centrifugal means, the improvement which comprises passing said resultant starch slurry with countercurrent washing through a series of hydroclones for removal of residual fiber and solubles.

According to the improved process of the present invention, the fresh tapioca roots, for example, after being washed and peeled and passed through a dicing machine or precrusher are subjected to the action of an impact mill (described hereinafter) wherein the starch-bearing material is impacted but not sheared or torn as in prior machines. Dried roots are already diced so they require only a rehydration treatment prior to the action of an impact mill. Thereafter, the resultant starch-fiber-fruit water mixture may be washed in conventional manner, with fresh water over a series of sieves or shakers to wash the liberated starch from the fiber and to separate the bulk of fiber therefrom. However, the present invention includes as an optional, but preferable, step the use of a washing system involving a series of centrifuges or screen pumps (described hereinafter) characterized in that the last part of the wall of the helical casing consists of a screen. The washing may be done directly or in counter-current manner. The resultant mill starch slurry from either washing system which contains starch, residual fiber and soluble material may be passed over conventional tables or through centrifuges for final purification. However, the present invention also includes as an optional, but preferable, step the use of hydroclones in counterecurrent manner in the removal of residual fiber and solubles from the mill starch. In the preferred embodiment of the present invention, a combination of impact mills, screen pumps and hydroclones at the stages indicated is used.

Before describing the invention in greater detail, a description will be given of the impact mill and screen pump referred to hereinabove. Referring first to the impact mill, this is not limited to any particular type. Impact mills of many designs may be used with success in the practice of the present invention. However, a description of one machine which has been found capable of achieving the impacting effect for the practice of the present invention will now be given for illustrative purposes.

Referring to FIGURE 1, this apparatus comprises a substantially rectangular main supporting frame generally indicated at 110 supported by legs 112. A motor 114 is suspended from frame 110, being directly secured to a supporting plate 116 depending downwardly from the frame to support the motor with drive shaft 118 extending vertically upwardly from motor 114. As best seen in FIGURE 2, the rotor 120 of the impact mill is mounted on a drive shaft 122 extending vertically upwardly and rotatably mounted in bearings 124 and 126. The shaft 122 extends through a top supporting plate 128, which not only forms a closure for the upper portion of the impact mill but also has suspended therefrom the casing 130. The rotor 120 associated driving mechanism is thus rotatably supported beneath plate 128 and is completely enclosed by the depending annular flange 128a thereof togethere with casing 130. A cross bar 132 (FIGURE 1) is connected to frame 10, and the top supporting plate 128 is suspended from the frame and cross bar by the stud bolts 134, 136, and 138, thus providing a three-point suspension therefor.

Chutes 140 and 142 are formed in an upper structure generally indicated at 144 and diverge from the central portion of plate 128 immediately above the corresponding portion of rotor 120. Shafts 122 and 118 carry pulleys 146 and 148, respectively, which are interconnected by a belt 150 so that the motor 114 may drive rotor 120 through shaft 122. Thus, the impact mill with related parts comprises the upper supporting plate 128 with suitable chutes 140 and 142 for entrance of the grain to be milled and an upper plate 151, all of which are integral and provide a firm base for the attachment of both bearings 124 and 126.

The rotor comprises a bottom circular plate 152 having a hub 154 bolted or otherwise secured to shaft 122. It also includes an upper ring plate 156 and a plurality of pins 158 evenly spaced about the circumference of plates 152 and 156 and connected therebetween. These pins 158 may take any convenient shape, although we have found pins, substantially round in shape as shown in FIGURE 2, to be entirely suitable. The surface of plate 152 from the hub 154 to the row of pins 158 is free from obstruction so that in operation the acceleration of the material moving toward the pins is unimpeded. An outer ring 160 is secured to plate 128, and a plurality of circumferentially spaced impacting pins 162 are bolted to and depend downwardly therefrom directly in the path of material being discharged by the rotor.

In operation, motor 114 drives the rotor 120 at high speed, and material to be treated is discharged from chutes 140 and 142 on plate 152 of the rotor adjacent hub 154. As it is impelled outwardly by centrifugal force, it spreads out in a thin, substantially even stream over the unobstructed surface of plate 152. Accordingly, it accelerates rapidly and in such a thin stream hits and is hit by pins 158 resulting in breakage of the individual particles of the material being treated to release individual starch granules. It then shoots outwardly for further severe impacting on impacting pins 162. The unobstructed space between the hub 154 and pins 158 together with the concentrically arranged rows of pins 158 and 162 make for a highly efficient impacting action most important to the successful practice of our invention.

Returning to FIGURE 2, pins 158 are circumferentially evenly spaced about the rotor 120, and the clearance therebetween is larger than the largest dimension of any of the starch-bearing material which is to be processed by the machine. By the same token, the space between pins 158 and impacting pins 162 should also be larger than the largest dimension of any of this starch-bearing material. Further, the rotor 120 must be driven at sufficient speed to rupture the material as it passes through the machine. Thus, in passage through the impacting mill, the starch-bearing material is never subjected to any tearing or shearing action; the work done on the material by the machine is confined exclusively to pure impact blows and this we term "pure impacting." More particularly, the material is directed by chutes 142 and 140 to the central or hub portion of the rotor 120 which is preferably rotated at a considerable speed to pick up such material and shoot it outwardly by centrifugal force and very great velocity. The material then hits the pins 158 where it may receive one or more blows of considerable intensity before being flung out against the impacting pins 162. Thus without any tearing or shearing, the material drops down and is released through the casing 130.

The term "impact" or "impacting," as used throughout the specification and claims, means substantially instantaneous acceleration of particles by forcibly contacting said particles with a plurality of rapidly moving surfaces, or the instantaneous deceleration of rapidly moving particles by contacting said particles on a plurality of surfaces; the clearance between the accelerating surfaces and the decelerating surfaces must be large enough to avoid any appreciable abrasion of the particles as they pass from the accelerating surfaces to the decelerating surfaces; and provision must be made to allow the particles to pass quickly from the areas containing the accelerating and decelerating surfaces to substantially inhibit abrasion and heat generation, thus minimizing particle size reduction and heat damage.

These centrifugal impact mills accelerate the starch-bearing material before striking it with moving surfaces (pins 158 in the machine described) and stationary surfaces (pins 162 as described), but it should be understood that many variations of the equipment shown are easily within the scope of this invention. For example, the machine described might have an additional rotor with the pins 162 mounted thereon and concentric with the rotor 120. Such rotor might operate in a direction opposite to that of rotor 120, thereby achieving an impacting action of double intensity on the product hitting the pins 162; other types of impact mills may be used successfully.

Our various tests with this equipment indicate that the velocity imparted to the material by the impact mill is not a critical factor. Of course, it is necessary to have sufficient velocity to effect necessary breakage of the various structures imprisoning the starch granules. But this may be accomplished by a single machine operating at very high speeds designed for more impacting, or it might be accomplished by two or more machines operating at lower speeds in series. It goes without saying that the higher the speed, the greater power consumption, and the more wear and tear on the machine. Therefore it becomes a matter of economics to decide on the type of machine to be used and the velocities to be imparted to the material being treated. To some extent this would depend upon the character of the starch-bearing material to be treated, the cost of the impacting equipment, and the cost of power where the equipment is to be used. Perhaps, the essence of the type of centrifugal impacting action which we may utilize in our novel method of wet impact milling is the provision of a high-speed rotor which has sufficient distance between its hub portion and the impacting area where the material to be treated is initially directed to permit the material to achieve high velocities when traveling over a substantially unobstructed area before encountering the impacting elements. In other words, this unobstructed area in the rotor allows centrifugal force to induce the individual particles to pick up such velocity as to effect the necessary bursting or splitting action when the particles reach the impacting area. As an example the rotor 120 of the machine herein described may be driven at a peripheral velocity of 20,000 feet per minute where the radial spacing between pins 158 and 162 is substantially one inch.

Referring now to the centrifugal screen pump, FIGURES 3 and 4 illustrate the embodiment which is suitable and preferred for purposes of the present invention. FIGURE 3 is a vertical longitudinal section of this embodiment on the line I—I in FIGURE 4. FIGURE 4 is a vertical cross-section on the line II—II in FIGURE 3.

The centrifugal screen pump according to FIGURES 3 and 4 is provided with a driving shaft 1 which is driven by a motor (not shown), a central supply 2 which is connected with a pump supplying the material to be treated. The blades 3 arranged between the plates 4 and 4', rotate in the direction indicated by the arrow when the centrifugal screen pump is in action. The first 180° of the wall of the helical casing of the pump consist of a closed wall 5. The following 180°, however, consist of a screen 6 which extends beyond the guiding blade 7 as the helical screen 8.

Between the wall 6 of the centrifugal pump consisting of a screen and the helical screen 8 in its elongation, there is a closed wall 9 which joins the closed part 5 of the wall of the helical casing.

The entire pump including the elongated helical screen 8 is enclosed in the housing 16 which is provided with an outlet 10 for the material which has passed the screen.

The guiding blade 7 is pivotally attached to the shaft 11. This shaft extends outside the housing 16 at the side of the supply 2 and carries a lever 12 with counterweight 13.

The material to be treated, for instance, a suspension of starch granules and fibers in water is supplied through the supply 2 and impelled against the screen 6 by the blades 3 as a result of which a large amount of the water and starch is separated from the fibers. The water and the starch passing the sieve collect on the lower part of the stationary wall 9. The guide blade 7 exerts a back pressure on the fibrous material remaining on the screen 6. Under th influence of the action of the pump this material is slid under the guiding plate 7 upwards along the helical screen 8 where further water is removed from it. The water and the starch collecting on the lower part of the stationary wall 9 are guided via the channel 14 below the lower part of the helical screen 8 where they combine with the liquid having passed the left hand and lower part of the helical screen 8. The solid fibrous material slid along the screen is discharged through the discharge 15 and after mixing with water supplied to a similar device, if desired.

The action of the screen pump of FIGURES 3 and 4 is peculiarly effective in getting the starch and fiber separated from each other when both are carried forward in a continuous liquid stream. In this liquid stream there are three items to be considered, namely, the water which is a carrier, and the starch and fiber which are separate solids but which are intermingled and to some extent they cohere. These solids are to be separated while they are moving through the screen pump in suspension. The impeller drives the stream of mixture both radially and tangentially of the volute wall. The fiber tends to be retained on the screen and is carried forward with some of the liquid, while the major part of the liquid carrying starch granules passes through the screen. The rapid passage of the blades of the pump impeller over the fibers on the screen produces impulses of pressure that tend to press or squeeze the fiber against the screen and free the starch granules from the fiber into the aqueous vehicle. The starch granules are then carried in the water which is discharged through the screen. The aforesaid separation of starch from fiber while the two are moving together in a liquid carrier is rapid and effective. Quantitatively it is highly efficient.

During the starch washing operation it is preferred to arrange a number of centrifugal screen pumps in series. Either countercurrent or direct methods of washing may be used, as will be shown hereinafter.

Referring now to FIGURES 5, 6 and 7, these show the course of the tapioca roots from the time they enter the process until the starch recovered therefrom is in substantially pure form ready for final dewatering and drying.

Referring to FIGURE 5, fresh tapioca roots and water from a supply source 17 are introduced into a combination washing and peeling device 18. Additional water is supplied through line 19. From there they are passed through a pregrinder or dicing machine 20 and then introduced into the first pass impact mills 21 for milling. Alternatively, dried roots may be steeped to rehydrate them and thereafter they may be introduced directly or after washing into the impact mills 21. The resultant fiber-starch-fruit water mixture is pumped into the first stage screen pumps 22. Tailings from screen pumps 22 are further ground in the second pass impact mills 23 and the filtrate from screen pumps 22 are sent to the mill starch supply tank 24. The fiber washing is carried out with screen pumps 22, 25, 26 and 27 in four stages. Pumps equipped with bar screens having a 100 micron profile are satisfactory. Fresh water is introduced through line 28 after the third pass 26 and filtrates from each pump are returned countercurrently through the system as shown. Fibers from screen pumps 27 may be discarded or recovered for animal feed through discharge line 29. Fresh water requirement for the fiber washing is about 1200 to 1300 U.S. gallons per ton of roots, depending upon the starch content of the roots. The density of the mill starch obtained is about 2.5° Bé.

In view of the possibility that countercurrent recirculation of filtrates as shown in FIGURE 5 may cause a build-up of bacterial growth and increased enzymatic action resulting in degradation of the starch it is preferable to carry out the fiber washing by introducing fresh water in any one pass or more than one pass along the screen pump battery. If fresh water is introduced at various places, the filtrates from the screen pumps may be drawn off individually to the mill starch tank 24 or recirculated in part or completely. FIGURE 6 shows the addition of water through lines 30 to 33 ahead of each screen pump 34 to 37 and the collection of the individual filtrates in mill starch tank 24. In any arrangement using fresh water at various stages the fresh water requirement will be about the same as aforementioned, in which case the mill starch will also have a density of about 2.5° Bé.

In FIGURE 7, mill starch from the mill starch supply tank 24 is pumped to grit clones (hydroclones designed to remove hard particles such as sand, pebbles, small pieces of steel, etc.) arranged in three stages 38, 39 and 40 for the removal of sand and other extraneous materials. The use of grit clones for this purpose is known and the arrangement shown is FIGURE 7 is illustrative, there being various arrangement possible. Fresh water may be introduced through line 41. The degritted mill starch is next concentrated in a centrifugal concentrator 42 to a density of about 16 to 18° Bé. The water from the concentrator 42 (called fruit water) and which contains about 90 percent of the soluble material present in the milled roots is discarded to the sewer through line 43. Fresh water is introduced into concentrator 42 through line 44.

The starch concentrate is diluted in mill starch supply tank 52 with overflow from dewatering centrifugal 45 and the overflow from the second stage 47 of washing hydroclones 46 to 51 as shown in FIGURE 6. The density of the resultant starch slurry is about 6 to 7° Bé.

The diluted starch slurry is now passed through one or more stages of clean up shakers 53, 54 equipped with nylon to remove residual fine fibers and fresh water inlet 55 and discharge line 56. The filtrate from the second stage shakers 54 is returned to mill starch supply tank 24.

Starch filtrate from the first stage clean-up shakers 53 is sent to a six-stage hydroclone washing operation in known countercurrent manner. The starch slurry enters the first stage 46 of hydroclones 46 to 51. Degritting of the wash water is accomplished in a separate hydroclone 57 having fresh water inlet 58 and discharge line 59. The flow of the starch slurry is readily ascertained from FIGURE 6. The starch slurry which leaves the hydroclone washing system is substantially free of fibers and solubles and is dewatered in dewatering centrifugal 45 to a moisture content of 35–37 percent after which it is removed through line 60 and may be dried to the customary moisture content as in a flash drier.

The system just described may be varied considerably without departing from the scope of the invention. For example, the impact mill as already mentioned may be used in two or more passes with or without grating machines although two passes of mills are usually sufficient. Similarly there may be in the system a greater or smaller number of screen pumps or of grit and hydroclones than shown in the drawings. A combination of direct and countercurrent washing may be used.

The advantages of the present invention are several and represent great improvements over prior art methods. For example, by the use of impact mills the amount of bound starch in the waste fiber is reduced significantly— for example, from 35 percent bound starch to as low as 15 to 20 percent. Consequently the yield of starch recovered is greatly increased. In a plant milling 100 tons of root per day by the process of the present invention, the starch loss in the fiber would be only 0.7 ton or less of starch whereas when using prior art processes the loss would be as high as 2.7 tons or more of starch. Moreover, since the particles of fiber are larger and more uniform than those produced, for example, by a grating machine, the washing steps are more easily carried out. Furthermore, the maintenance on an impact mill of the type described is much less since it is not as readily nor as frequently incapacitated by pebbles, etc., as are grating machines.

The screen pumps described heretofore have greatly increased capacity over conventional sieves and shakers, one pump having a capacity of at least 6 or 7 shakers. This obviously decreases building requirements, maintenance, power and capital investment.

A further and important advantage of the present invention lies in the use of hydroclones which are a more economical form of reducing solubles in starch slurries, e.g., mill starch, than any other known means. The total of the aforementioned advantages and the great contribution added to the art by the present invention are readily apparent.

This application is a continuation-in-part of application Serial No. 692,876, filed October 28, 1957, now abandoned.

We claim:

1. The process of recovering starch from fibrous starch-bearing material, which comprises forming an aqueous slurry of the material, impacting the material and thereby rupturing the starch cells and releasing the starch granules therefrom while otherwise avoiding material alteration in particle size and condition of the material, and thereafter screening the slurry thereby separating out the fibrous component thereof while passing the liquid and starch components of the slurry through the separated out fibrous component thereby separating the starch therefrom.

2. The process of recovering starch from fibrous starch-bearing material, which comprises forming an aqueous slurry of the material, projecting the slurry at substantial velocity against impact members effective for impacting the material and thereby rupturing the starch cells and releasing the starch granules therefrom while otherwise avoiding material alteration in particle size and condition of the material, and thereafter screening the slurry thereby separating out the fibrous component thereof while passing the liquid and starch components of the slurry through the separated out fibrous component thereby separating the starch therefrom.

3. The process of recovering starch from fibrous starch-bearing material, which comprises forming an aqueous slurry of the material, distributing the slurry in a thin circular sheet and projecting it radially outward at substantial velocity against impact members effective for impacting the material and thereby rupturing the starch cells and releasing the starch granules therefrom while otherwise avoiding material alteration in particle size and condition of the material, and thereafter screening the slurry thereby separating out the fibrous component thereof while passing the liquid and starch components of the slurry through the separated out fibrous component thereby separating the starch therefrom.

4. The process of recovering starch from fibrous starch-bearing material, which comprises forming an aqueous slurry of the material, impacting the material and thereby rupturing the starch cells and releasing the starch granules therefrom while otherwise avoiding material alteration in particle size and condition of the material, and thereafter screening the slurry thereby separating out the fibrous component thereof and providing a travelling bed of such fibrous component while passing the liquid and starch components of the slurry through the separated out fibrous component thereby separating the starch therefrom.

5. The process of recovering starch from fibrous starch-bearing material, which comprises forming an aqueous slurry of the material, impacting the material and thereby rupturing the starch cells and releasing the starch granules therefrom while otherwise avoiding material alteration in particle size and condition of the material, and thereafter passing the slurry through a screen thereby separating out the fibrous component and continuously advancing it along the screen while passing the liquid and starch component of the slurry through the separated out fibrous component thereby separating the starch therefrom.

References Cited in the file of this patent

UNITED STATES PATENTS

| | | |
|---|---|---|
| 316,405 | Schuman | Apr. 21, 1885 |
| 358,974 | Grimm | Mar. 8, 1887 |
| 412,321 | Burkman | Oct. 8, 1889 |
| 1,798,811 | Riemann | Mar. 31, 1931 |
| 2,184,598 | John | Dec. 26, 1939 |
| 2,428,670 | Hulse | Oct. 7, 1947 |
| 2,651,470 | Dodds et al. | Sept. 8, 1953 |
| 2,798,011 | Fontein et al. | July 2, 1957 |